(12) United States Patent
Fujimoto et al.

(10) Patent No.: US 10,307,835 B2
(45) Date of Patent: Jun. 4, 2019

(54) TOOL ATTACHMENT/DETACHMENT DEVICE AND MACHINE TOOL

(71) Applicant: DMG MORI CO., LTD., Nara (JP)

(72) Inventors: Koji Fujimoto, Nara (JP); Tatsuhiko Kuriya, Nara (JP)

(73) Assignee: DMG MORI CO., LTD., Nara (JP)

( * ) Notice: Subject to any disclaimer, the term of this patent is extended or adjusted under 35 U.S.C. 154(b) by 0 days.

(21) Appl. No.: 16/066,583

(22) PCT Filed: Sep. 5, 2016

(86) PCT No.: PCT/JP2016/075958
§ 371 (c)(1),
(2) Date: Jun. 27, 2018

(87) PCT Pub. No.: WO2017/119156
PCT Pub. Date: Jul. 13, 2017

(65) Prior Publication Data
US 2019/0015905 A1    Jan. 17, 2019

(30) Foreign Application Priority Data

Jan. 7, 2016  (JP) ................................ 2016-001705

(51) Int. Cl.
*F16B 2/06*    (2006.01)
*B23B 29/24*    (2006.01)
(Continued)

(52) U.S. Cl.
CPC ............ *B23B 29/24* (2013.01); *B23B 31/204* (2013.01); *B23B 31/305* (2013.01); *F16B 2/06* (2013.01);
(Continued)

(58) Field of Classification Search
CPC ..... B23B 29/24; B23B 29/242; B23B 31/204; B23B 31/305; F16B 1/005; F16B 2/06;
(Continued)

(56) References Cited

U.S. PATENT DOCUMENTS 2,683,606 A * 7/1954 Coleman ............... B23B 31/025
279/136
4,643,056 A * 2/1987 Arehart ................. B23B 29/242
407/11
(Continued)

FOREIGN PATENT DOCUMENTS

DE    102010009669 A1    9/2011
DE    102015012938 A1 *  4/2017 ............. B23B 29/20
(Continued)

OTHER PUBLICATIONS

"JP International Search Report", dated Nov. 22, 2016 (Nov. 22, 2016) for JP Application No. PCT/JP2016/075958, 10pgs.

*Primary Examiner* — Eric A Gates
(74) *Attorney, Agent, or Firm* — Cozen O'Connor

(57) ABSTRACT

This invention provides a machine tool capable of easily and quickly attaching/detaching a tool holder while reliably holding the tool holder, including at least two clamp holes (211) that receive pins (203) extending through at least two through holes (202) provided in a tool holder (134), at least two tubular clamp sleeves (302) fitted in the at least two clamp holes (211), respectively, and each including a flexible trunk portion (321), a fluid encapsulating chamber that encapsulates a fluid, a channel extended from the fluid encapsulating chamber to an outer peripheral surface of the flexible trunk portion, and a pressure adjusting portion that adjusts a pressure of the fluid in the fluid encapsulating chamber, wherein a clamp fastening force is made to act on
(Continued)

the pins (203) in synchronism with an increase or a decrease in the fluid pressure in the fluid encapsulating chamber.

8 Claims, 11 Drawing Sheets

(51) Int. Cl.
*B23B 31/20* (2006.01)
*B23B 31/30* (2006.01)
*F16B 19/12* (2006.01)
*F16B 21/16* (2006.01)
*F16B 1/00* (2006.01)

(52) U.S. Cl.
CPC .............. *F16B 19/12* (2013.01); *F16B 21/16* (2013.01); *F16B 1/005* (2013.01); *Y10S 279/901* (2013.01); *Y10T 279/1249* (2015.01); *Y10T 279/16* (2015.01)

(58) Field of Classification Search
CPC ........ F16B 19/12; F16B 21/16; Y10S 279/90; Y10S 279/901; Y10T 279/1249; Y10T 279/1283; Y10T 279/16; Y10T 279/33
See application file for complete search history.

(56) References Cited

U.S. PATENT DOCUMENTS

| | | | | |
|---|---|---|---|---|
| 4,763,401 | A * | 8/1988 | Marinoni | B23K 11/318 279/119 |
| 6,860,477 | B2 * | 3/2005 | Etter | B23Q 1/0072 269/309 |
| 8,006,593 | B2 * | 8/2011 | Sahm | B23B 29/242 82/158 |
| 8,246,026 | B2 * | 8/2012 | Hyatt | B23B 29/323 269/289 R |
| 9,289,831 | B2 * | 3/2016 | Herud | B23B 31/12 |
| 2005/0129471 | A1 * | 6/2005 | Englund | B23B 29/046 407/101 |
| 2009/0095126 | A1 | 4/2009 | Hyatt et al. | |

FOREIGN PATENT DOCUMENTS

| | | |
|---|---|---|
| JP | 48-013017 Y | 4/1973 |
| JP | 53-027178 A | 3/1978 |
| JP | 58-052302 U | 4/1983 |
| JP | 63-002276 Y | 1/1988 |
| JP | 64-042818 U | 3/1989 |
| JP | 5-13455 Y2 | 4/1993 |
| JP | 5308893 B2 | 7/2013 |
| WO | 91/18699 A1 | 12/1991 |

\* cited by examiner

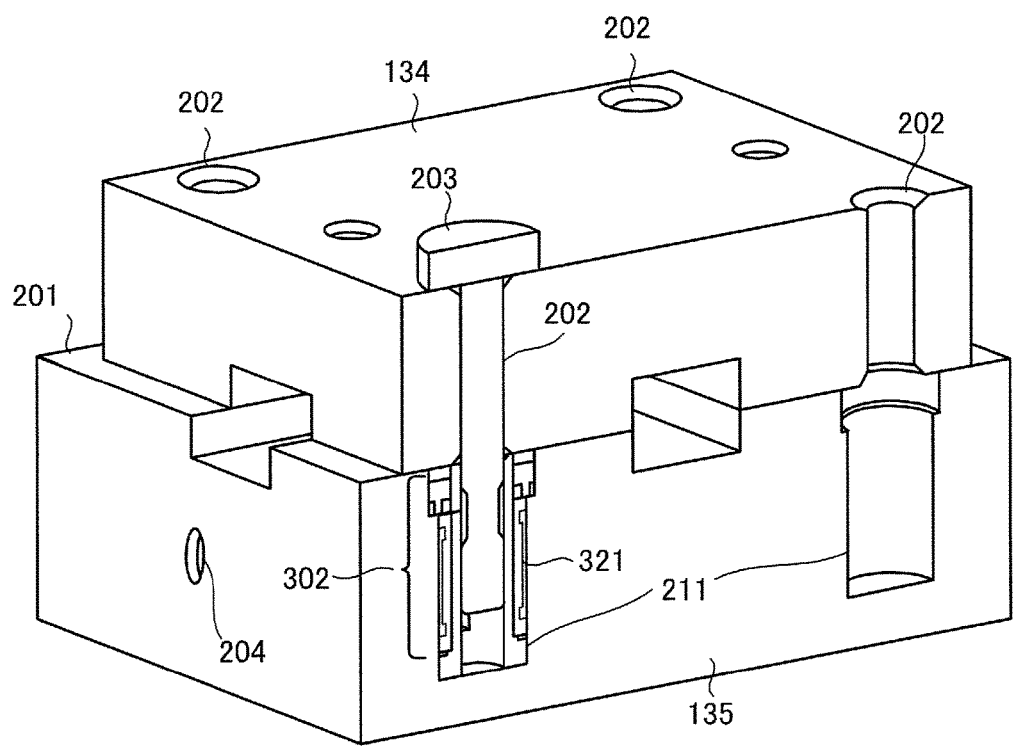
F I G. 3

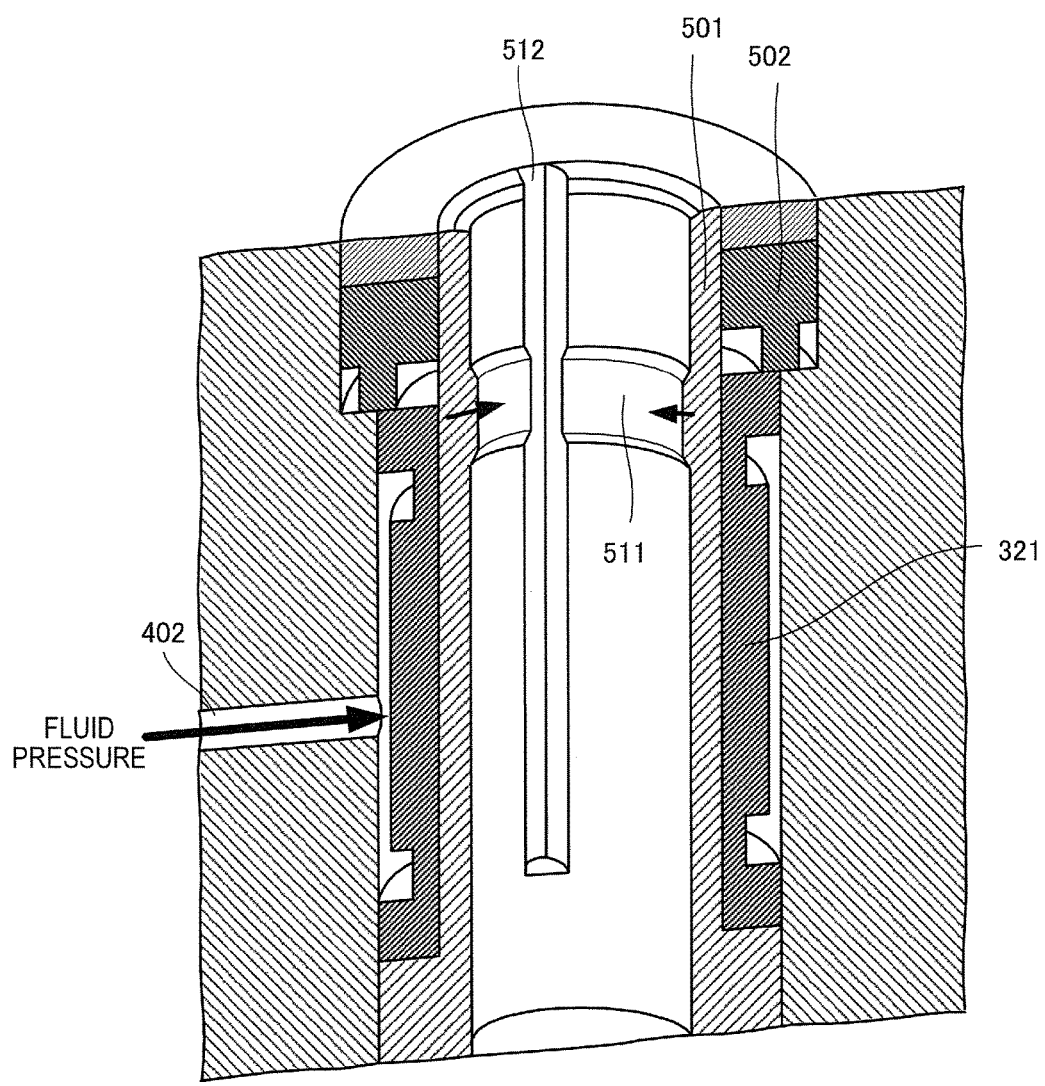
F I G. 5

TOOL ATTACHMENT/DETACHMENT DEVICE AND MACHINE TOOL

CROSS-REFERENCE TO RELATED APPLICATIONS

This application is a U.S. National Stage filing under 35 U.S.C. § 371 and 35 U.S.C. § 119 based on PCT/JP2016/075958, filed on Sep. 5, 2016, and claiming the benefit of priority from Japanese patent application No. 2016-001705, filed on Jan. 7, 2016, both of which are hereby incorporated herein in their entireties by reference.

TECHNICAL FIELD

The present invention relates to a tool attachment/detachment device and a machine tool.

BACKGROUND

In the above-described technical field, each of patent references 1 and 2 discloses a machine tool that attaches a tool to a tool holder and attaches the tool holder to the tool rest of a turret, thereby performing machining.

Patent reference 1: Japanese Patent No. 5308893
Patent reference 2: WO 91/18699

SUMMARY OF THE INVENTION

In the techniques described in the above references, however, since the tool holder is attached/detached by fastening or loosening tool bolts 18 provided at four corners, it takes long time to repetitively attach/detach the tool holder. On the other hand, there are many disadvantages such as an unbalance caused when the tool holder is fastened only at one point, and a force acting on the tool is received at the one point.

The present invention enables to provide a technique of solving the above-described problems.

One example aspect of the present invention provides a tool attachment/detachment device comprising:

at least two clamp holes that receive pins extending through at least two through holes provided in a tool holder;

at least two tubular clamp sleeves fitted in the at least two clamp holes, respectively, and each including a flexible trunk portion;

a fluid encapsulating chamber that encapsulates a fluid;

a channel extended from the fluid encapsulating chamber to an outer peripheral surface of the flexible trunk portion; and a pressure adjusting portion that adjusts a pressure of the fluid in the fluid encapsulating chamber, wherein a clamp fastening force is made to act on the pins in synchronism with an increase or a decrease in the fluid pressure in the fluid encapsulating chamber.

According to the present invention, it is possible to provide a machine tool capable of easily and quickly attaching/detaching a tool holder while reliably holding the tool holder.

BRIEF DESCRIPTION OF DRAWINGS

FIG. 3 is a partially cutaway perspective view showing the internal arrangement of the turret and the tool holder according to the first example embodiment of the present invention;

FIG. 5 is a partially cutaway perspective view showing the arrangement of a clamp sleeve according to the first example embodiment of the present invention;

DESCRIPTION OF EXAMPLE EMBODIMENTS

Example embodiments of the present invention will now be described in detail with reference to the drawings. It should be noted that the relative arrangement of the components, the numerical expressions and numerical values set forth in these example embodiments do not limit the scope of the present invention unless it is specifically stated otherwise.

First Example Embodiment

Figure 1:
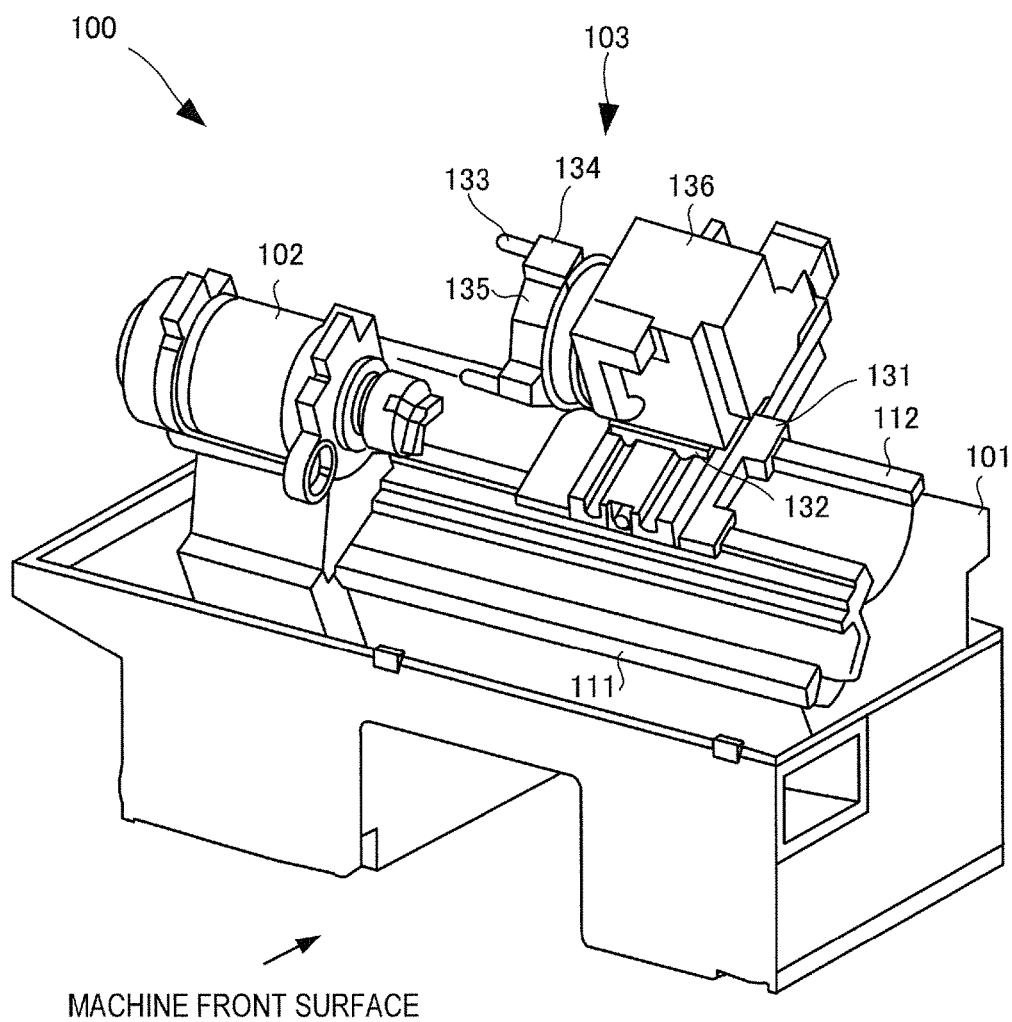
FIG. 1 is an external perspective view showing the arrangement of a machine tool according to the first example embodiment of the present invention.

A machine tool to which a tool attachment/detachment device according to the first example embodiment of the present invention is applicable will be described with reference to FIG. 1. FIG. 1 is an external perspective view showing a lathe 100 as an example of a machine tool. When viewed from the front of the machine, the lathe 100 includes a slant type bed 101 extending in a horizontal direction, a headstock 102 provided on the left side of the bed 101, and a cutter holder 103 disposed on the right far side of the bed 101.

The bed 101 includes guide rails 111 and 112 on the near and far sides. The headstock 102 can slide along the guide rail 111 in the horizontal direction (the axial direction of the headstock 102 or the Z-axis direction).

A Z-axis movable base 131 is supported by the guide rail 112 so as to be movable in the Z-axis direction. A Y-axis movable base 132 is supported on the Z-axis movable base 131 so as to be movable in the Y-axis direction orthogonal to the Z-axis direction.

The cutter holder 103 is mounted on the Y-axis movable base 132. Accordingly, the cutter holder 103 can move in the Y- and Z-axis directions.

The cutter holder 103 includes a tool holder 134 that holds a tool 133, a turret 135 to which a plurality of tool holders 134 are detachably attached, and a rotating mechanism 136 that rotates and positions the turret 135 such that the tool 133 is located at a predetermined machining position.

Figure 2:
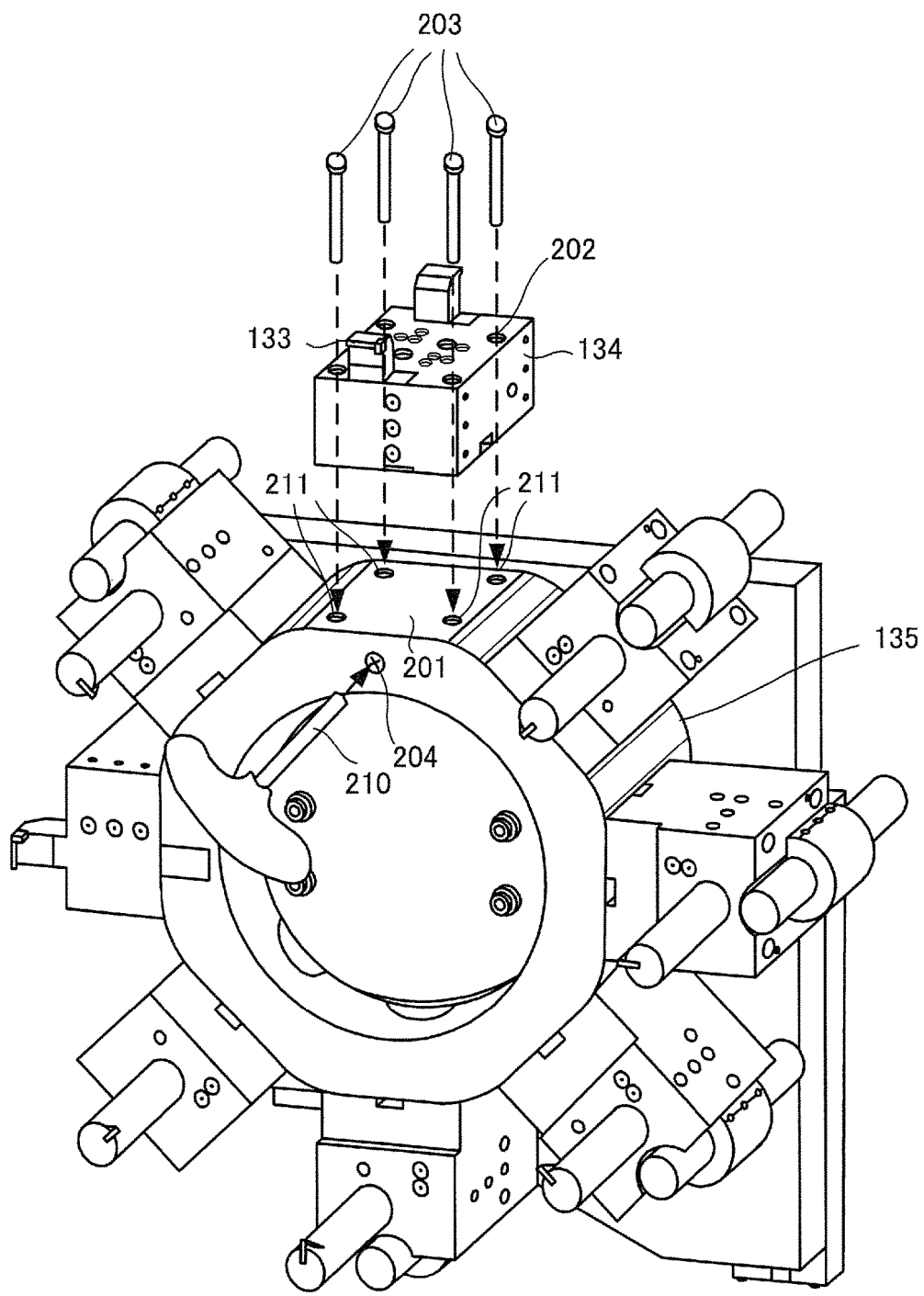
FIG. 2 is an external perspective view showing the arrangement of a turret and a tool holder according to the first example embodiment of the present invention.

FIG. 2 is an external view showing the turret 135 viewed from the front side (headstock side). A plurality of holder attachment surfaces 201 each forming a flat surface are formed on the outer peripheral surface of the turret 135 at a predetermined angle interval. The tool holder 134 is detachably fixed to the holder attachment surface 201.
Through holes 202 that are parallel are formed at the four corners of the tool holder 134. Four pins 203 extending through the through holes 202 are inserted into four clamp holes 211 provided in the holder attachment surface 201. After the four pins 203 are inserted into the clamp holes 211, a bolt 204 is fastened using a wrench 210. A clamp fastening force thus acts on the four pins 203, and the tool holder 134 is fixed to the turret 135.

Figure 4:
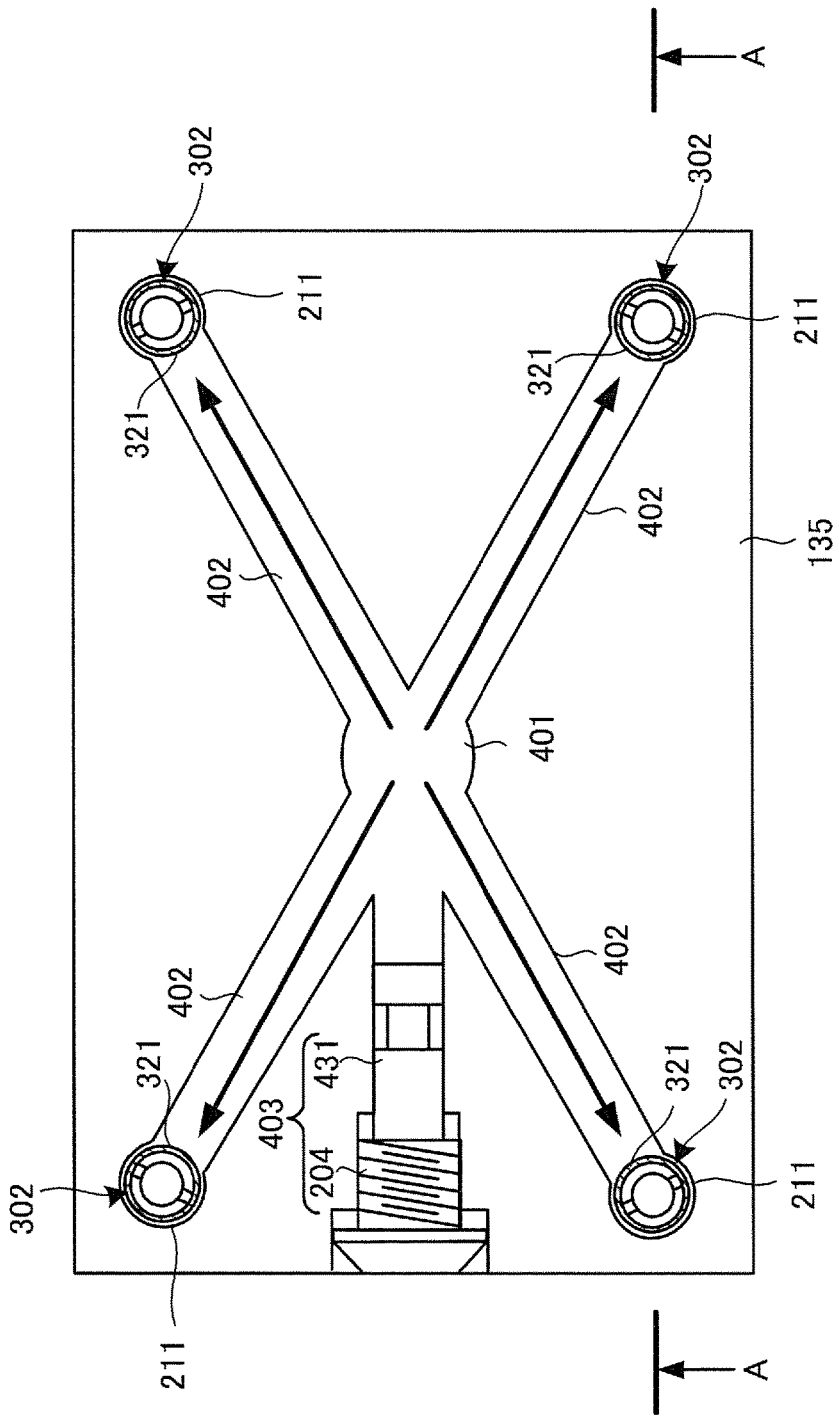
FIG. 4 is a sectional view showing a channel arrangement in the turret according to the first example embodiment of the present invention.

FIG. 3 is a partially cutaway view that cuts out the tool holder 134 and the vicinity of the holder attachment surface 201 of the turret 135. FIG. 4 is a cross-sectional view for explaining a channel arrangement provided under the holder attachment surface 201 of the turret 135. FIG. 3 shows a sectional view taken along a line A-A in FIG. 4. A state in which only one pin 203 is inserted is shown here for the descriptive convenience. As shown in FIG. 3, the turret 135 as a tool attachment/detachment device includes the four clamp holes 211 and clamp sleeves 302. The pins 203 extending through at least two through holes 202 provided in the tool holder 134 are inserted into the clamp holes 211. The clamp sleeve 302 includes a flexible trunk portion 321 that has a tubular shape, is fitted in each clamp hole 211, and deforms inward upon receiving a pressure from the outside.

FIG. 4 is a view taken along a plane that is parallel to the holder attachment surface 201 and passes through the center axis of the bolt 204. The channel arrangement includes a fluid encapsulating chamber 401, channels 402, and a pressure adjusting portion 403. The fluid encapsulating chamber 401 is a space to encapsulate a fluid inside the turret 135. The channel 402 makes the fluid encapsulating chamber 401 communicate with the clamp hole 211 and makes a fluid pressure act on the flexible trunk portion 321. The pressure adjusting portion 403 adjusts the pressure of the fluid in the fluid encapsulating chamber 401 and increase or decreases the inner diameter of the flexible trunk portion 321 in synchronism with the increase or the decrease in the fluid pressure in the fluid encapsulating chamber 401. More specifically, the pressure adjusting portion 403 includes a plunger 431 inserted toward the fluid encapsulating chamber 401, and the bolt 204 serving as a position changing portion that changes the position of the plunger 431. When the fluid pressure in the fluid encapsulating chamber 401 is increased, the clamp sleeve 302 makes a clamp fastening force act on the pin 203. As shown in FIG. 4, a total of four pairs of clamp holes 211 and clamp sleeves 302 are provided such that one pair is provided at each of the four corners of the holder attachment surface 201 of the turret 135. The fluid is made to communicate from the fluid encapsulating chamber 401 to the outer peripheral surfaces of the four flexible trunk portions 321.

FIG. 5 is a partially cutaway perspective view for explaining a detailed structure of the clamp sleeve 302. In addition to the flexible trunk portion 321, the clamp sleeve 302 includes a cylindrical portion 501 that includes a slit and is in contact with the inner wall of the flexible trunk portion 321, and a seal member 502 configured to seal, on the upper side, the fluid that applies a pressure to the outer peripheral surface.

The cylindrical portion 501 includes a convex portion 511 on the inner circumferential surface. When the upper end side of the cylindrical portion 501 bends inward in accordance with the inward deformation of the flexible trunk portion 321, the convex portion 511 presses the outer peripheral surface of the pin 203. Since a slit 512 is provided, the upper end portion of the cylindrical portion 501 is sufficiently bent inward even by a weak force.

Figure 6:
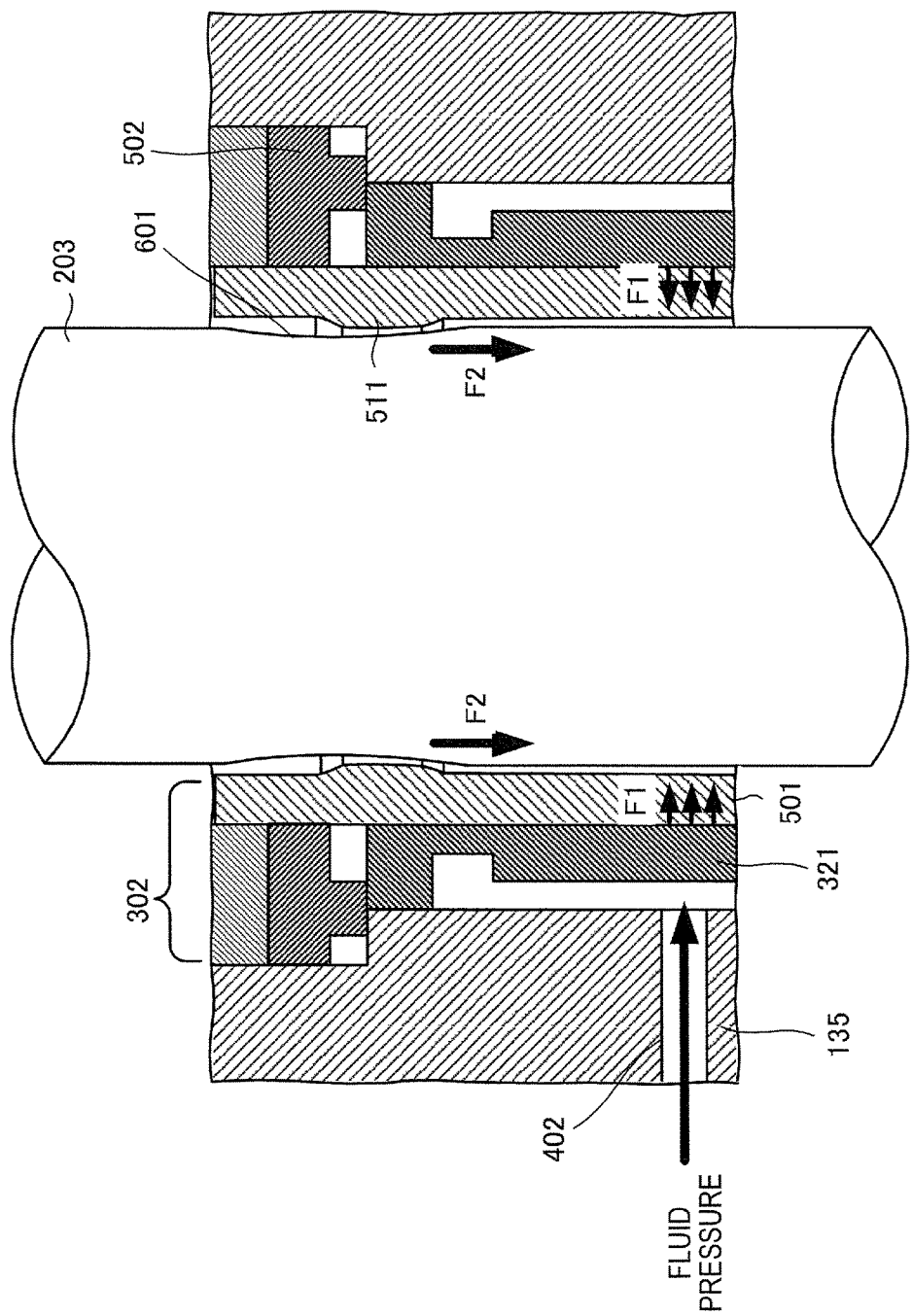
FIG. 6 is a partially cutaway enlarged view showing the arrangement of the clamp sleeve according to the first example embodiment of the present invention.

FIG. 6 is a view for explaining a more detailed structure of the clamp sleeve 302. FIG. 6 shows a state in which the pin 203 is inserted into the clamp sleeve 302. A strip-shaped concave portion 601 is provided in the outer peripheral surface of the pin 203. When the concave portion 601 engages with the convex portion 511 on the inner circumferential surface of the cylindrical portion 501, an inward force F1 applied from the cylindrical portion 501 is converted into a force F2 that presses the pin 203 downward. As a result, the pin 203 hardly comes off, and the tool holder 134 is firmly fixed to the holder attachment surface 201 of the turret 135.

Figure 7:
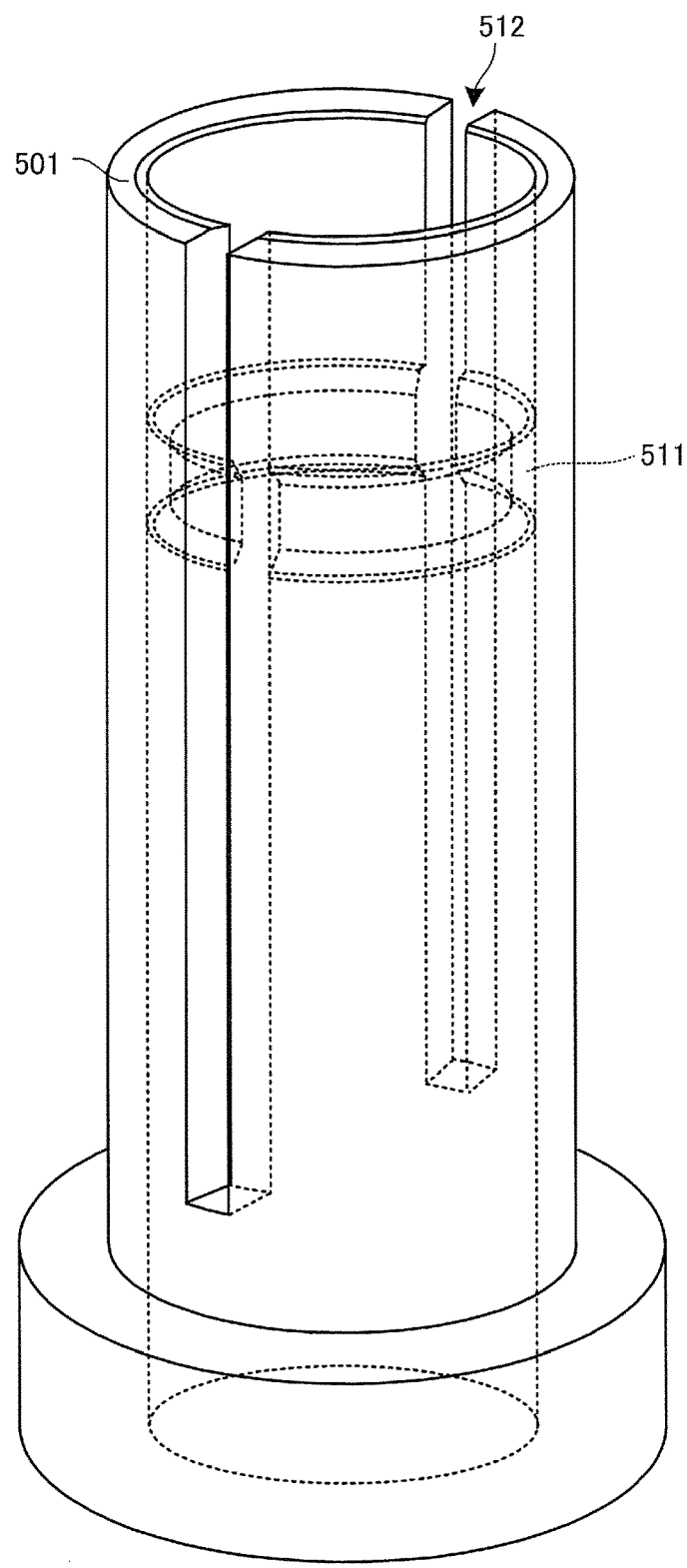
FIG. 7 is a perspective view showing the shape of a cylindrical portion 501 included in the clamp sleeve according to the first example embodiment of the present invention.

FIG. 7 is a perspective view showing only the cylindrical portion 501. The slits 512 are provided at two portions of the upper wall surface.

As described above, according to the arrangement of this example embodiment, it is possible to simultaneously make the fastening force act on the plurality of pins using the pressure of the fluid and easily and reliably fix the tool holder to the turret.

Second Example Embodiment

Figure 8:
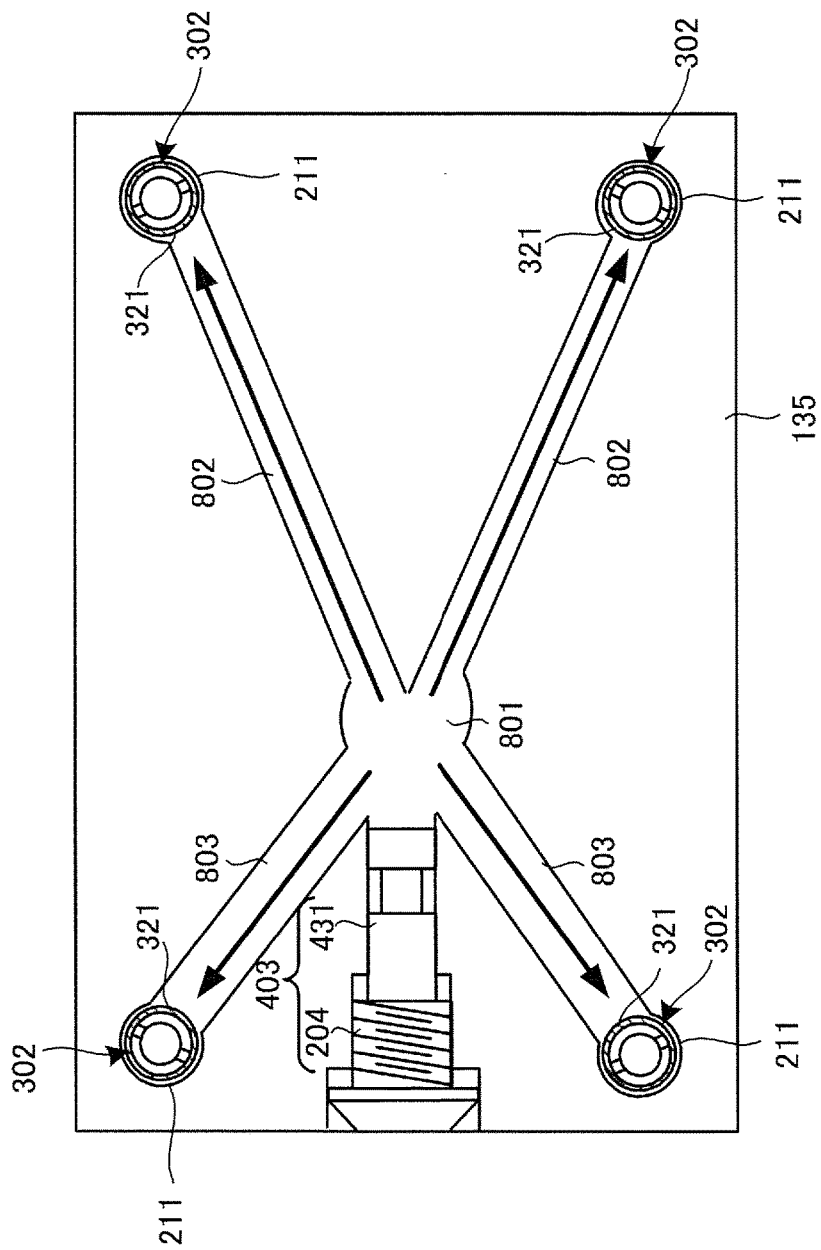
FIG. 8 is a sectional view showing a channel arrangement in a turret according to the second example embodiment of the present invention.

A tool attachment/detachment device according to the second example embodiment of the present invention will be described next with reference to FIG. 8. FIG. 8 is a view for explaining the channel arrangement of the tool attachment/detachment device according to this example embodiment. In this example embodiment, channels 802 and 803 have different sectional areas, as shown in FIG. 8, thereby generating different fastening forces, as compared to the first example embodiment. When the channel diameters are adjusted such that the fastening force to the two pins on the tool side becomes large, as shown in FIG. 8, the fluid pressure can intensively be distributed to the two pins on the machining chamber side that largely receives the force acting on the tool at the time of machining.

Third Example Embodiment

Figure 9:
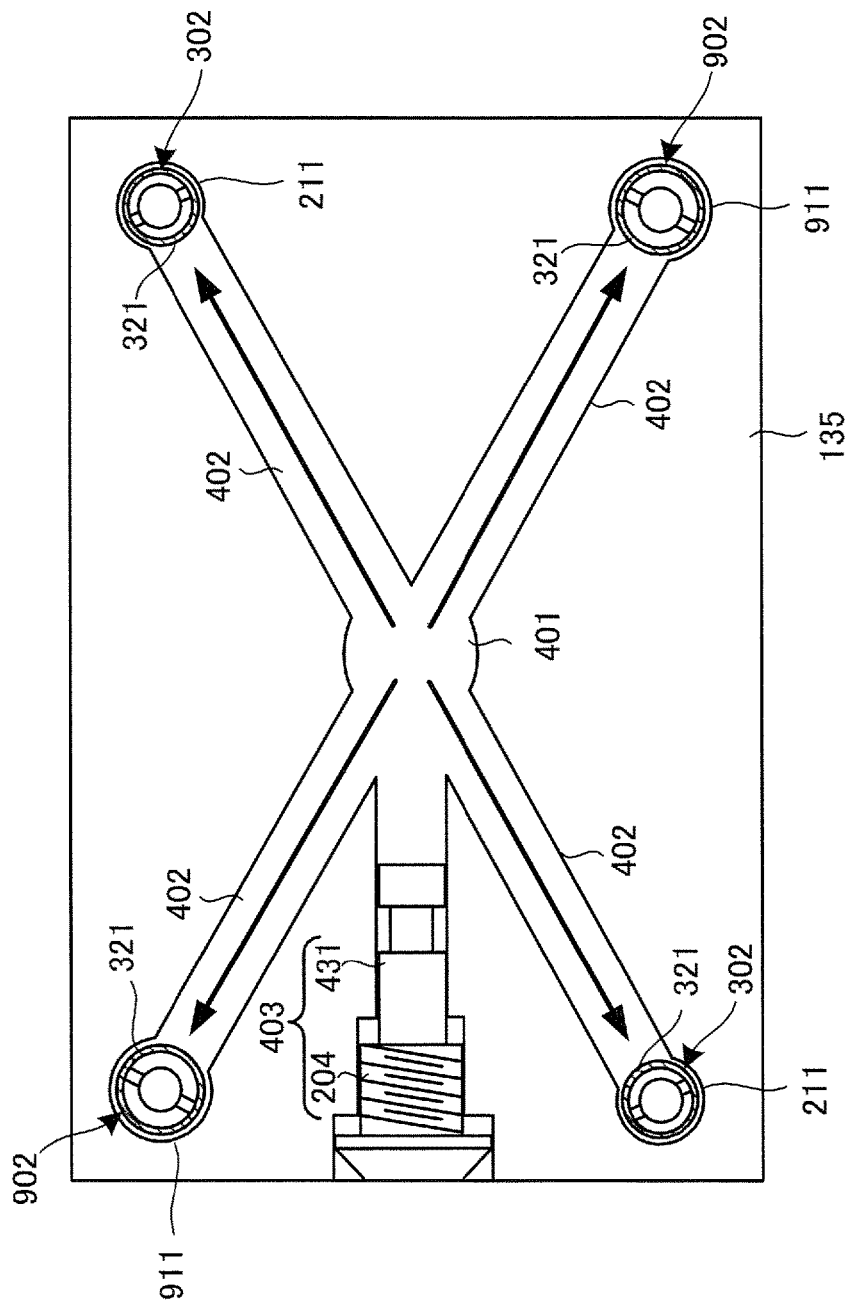
FIG. 9 is a sectional view showing a channel arrangement in a turret according to the third example embodiment of the present invention.

A tool attachment/detachment device according to the third example embodiment of the present invention will be described next with reference to FIG. 9. FIG. 9 is a view for explaining the channel arrangement of the tool attachment/detachment device according to this example embodiment. In this example embodiment, the inner diameter of each of clamp holes 911 located on a diagonal line is made larger than that of a clamp hole 211, and the outer diameter of a clamp sleeve 902 corresponding to the clamp hole 911 is made larger than the outer diameter of a clamp sleeve 302. Both the clamp sleeves 302 and 902 have an inner diameter that matches the outer diameter of a pin 203. Different fastening timings can thus be obtained. More specifically, the clamp sleeve 902 is fastened a step behind the clamp sleeve 302. The rest of the components and operations is the same as in the first example embodiment. Hence, the same reference numerals denote the same components and operations, and a detailed description thereof will be omitted.

If the fastening timings are designed such that diagonal fastening can be performed, as shown in FIG. 9, it is possible to relax residual stress at the time of fastening.

Fourth Example Embodiment

Figure 10:
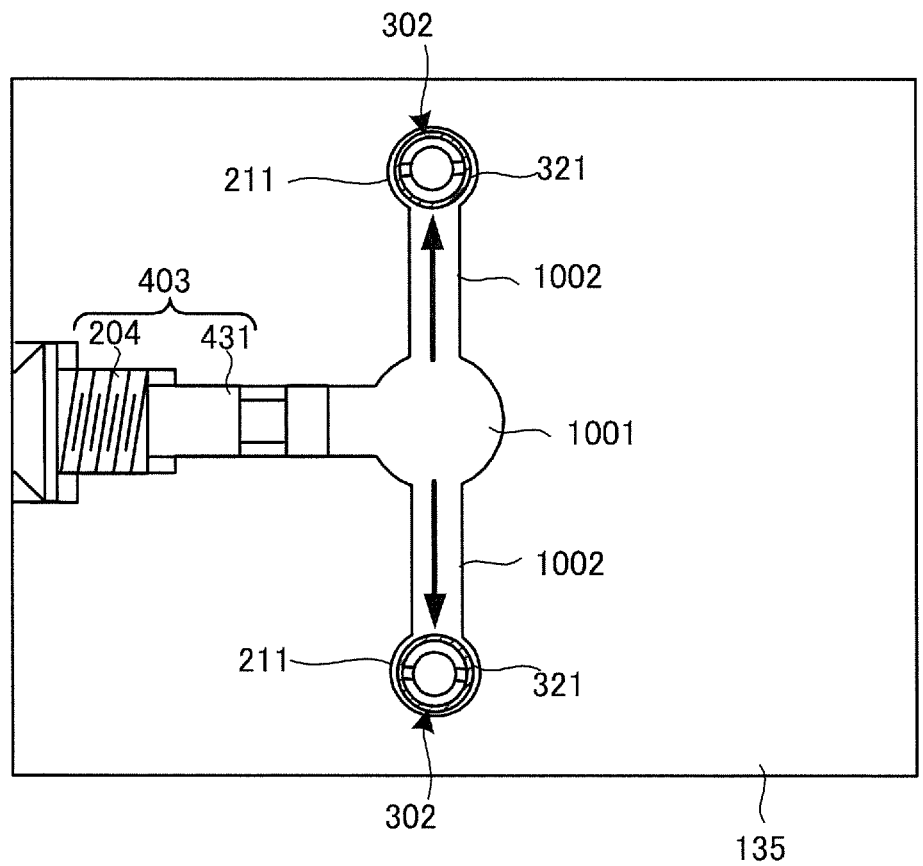
FIG. 10 is a sectional view showing a channel arrangement in a turret according to the fourth example embodiment of the present invention.

A tool attachment/detachment device according to the fourth example embodiment of the present invention will be described next with reference to FIG. 10. FIG. 10 is a view for explaining the channel arrangement of the tool attachment/detachment device according to this example embodiment. In this example embodiment, two clamp holes 211 are provided, and two pins are inserted into there, as shown in FIG. 10. For this reason, two channels 1002 are extended from a fluid encapsulating portion 1001 to the two clamp holes 211. The rest of the components and operations is the same as in the first example embodiment. Hence, the same reference numerals denote the same components and operations, and a detailed description thereof will be omitted.

With this design, a tool holder 134 can be fixed to a holder attachment surface 201 of a turret 135 by a simple arrangement.

Fifth Example Embodiment

Figure 11:
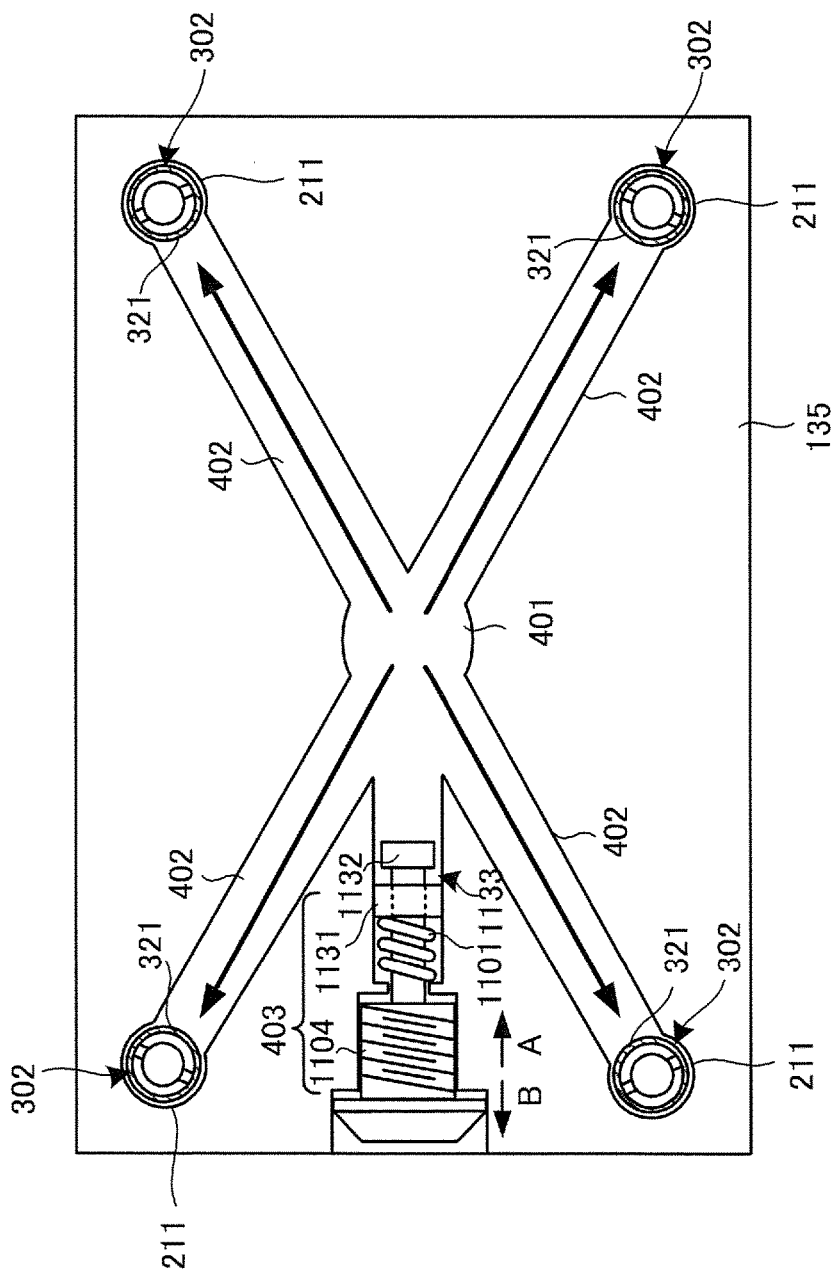
FIG. 11 is a sectional view showing a channel arrangement in a turret according to the fifth example embodiment of the present invention.

A tool attachment/detachment device according to the fifth example embodiment of the present invention will be described next with reference to FIG. 11. FIG. 11 is a view for explaining the channel arrangement of the tool attachment/detachment device according to this example embodiment.

When a screw 1104 is rotated and moved in a direction A, a plunger 1132 connected and fixed to the screw 1104 also moves in the direction A. Then, a piston 1131 serving as a fluid pressurizing portion is biased by a spring 1101 serving as a biasing portion and pressurizes a fluid in a fluid encapsulating chamber 401.

A design is made such that a gap 1133 is generated between the position of the front end face (the right end face in FIG. 11) of the piston 1131 in a state in which the spring 1101 is fully stretched and the rear end face (the left end face in FIG. 11) of the plunger 1132 in a state in which the screw 1104 is fully fastened. Hence, even if the screw 1104 loosens a little and moves leftward, the pressurization by the piston 1131 is retained. That is, unless the screw 1104 is loosened, the fluid pressure in the fluid encapsulating chamber 401 is kept high, and a clamp sleeve 302 can always make a fastening force act on a pin 203.

On the other hand, when the screw 1104 is rotated and moved in a direction B, the plunger 1132 also moves in the direction B, and the gap 1133 disappears. When the piston 1131 also moves in the direction B, the pressurization of the fluid is gradually canceled.

With this design, even if the screw 1104 loosens a little, the fastening force of the clamp sleeve 302 does not weaken. That is, it is possible to reliably and stably fix a tool holder 134 to a holder attachment surface 201 of a turret 135. In addition, when one screw 1104 is moved in the direction B, the tool holder 134 can easily be detached.

Other Example Embodiments

In the above example embodiments, X-shaped channels as shown in FIGS. 4, 8, 9, and 11 have been described. However, the present invention is not limited to this. A channel of another shape such as an H shape or a square shape may be formed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:
1. A tool attachment/detachment device comprising:
at least two clamp holes that receive pins extending through at least two through holes provided in a tool holder;
at least two tubular clamp sleeves fitted in the at least two clamp holes, respectively, and each including a flexible trunk portion;
a fluid encapsulating chamber that encapsulates a fluid;
a channel extended from the fluid encapsulating chamber to an outer peripheral surface of the flexible trunk portion; and
a pressure adjusting portion that adjusts a pressure of the fluid in the fluid encapsulating chamber,
wherein a clamp fastening force is made to act on the pins in synchronism with an increase or a decrease in the fluid pressure in the fluid encapsulating chamber.
2. The tool attachment/detachment device according to claim 1, wherein the pressure adjusting portion comprises:
a plunger inserted into the fluid encapsulating chamber; and
a position changing portion that changes a position of the plunger.
3. The tool attachment/detachment device according to claim 2, wherein a total of four sets of clamp holes and clamp sleeves are provided such that one set is provided at each of four corners of the tool attachment/detachment device, and the fluid is made to communicate from the fluid encapsulating chamber to outer peripheral surfaces of the four clamp sleeves.
4. The tool attachment/detachment device according to claim 3, wherein the pressure adjusting portion
simultaneously applies the pressure to the clamp sleeves in two clamp holes of the tool attachment/detachment device at a first timing, and
simultaneously applies the pressure to the clamp sleeves in two remaining clamp holes of the tool attachment/detachment device at a second timing different from the first timing.
5. The tool attachment/detachment device according to claim 1, wherein a total of four sets of clamp holes and clamp sleeves are provided such that one set is provided at each of four corners of the tool attachment/detachment device, and the fluid is made to communicate from the fluid encapsulating chamber to outer peripheral surfaces of the four clamp sleeves.
6. The tool attachment/detachment device according to claim 5, wherein the pressure adjusting portion
simultaneously applies the pressure to the clamp sleeves in two clamp holes of the tool attachment/detachment device at a first timing, and
simultaneously applies the pressure to the clamp sleeves in two remaining clamp holes of the tool attachment/detachment device at a second timing different from the first timing.
7. The tool attachment/detachment device according to claim 1, wherein the pressure adjusting portion comprises:

a fluid pressurizing portion inserted into the fluid encapsulating chamber;
a biasing portion that biases the fluid pressurizing portion toward the fluid encapsulating chamber; and
a position changing portion that changes a position of the fluid pressurizing portion.

8. A machine tool comprising a tool attachment/detachment device according to claim 1.

* * * * *